Sept. 26, 1950 V. L. TILLI 2,523,343
FIXTURE
Filed May 19, 1947
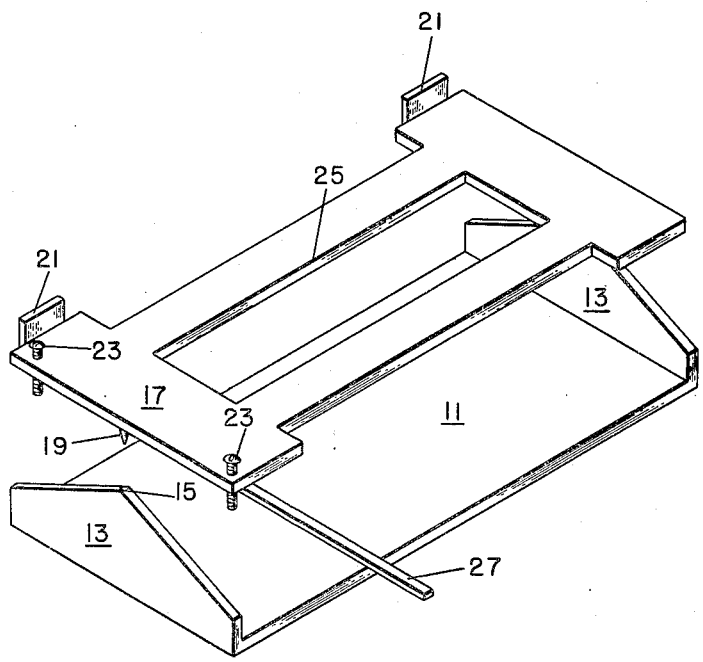
INVENTOR.
VINCENT L. TILLI
BY
*M. O. Hayes*
ATTORNEY Patented Sept. 26, 1950

2,523,343

UNITED STATES PATENT OFFICE 2,523,343

FIXTURE

Vincent L. Tilli, Philadelphia, Pa.

Application May 19, 1947, Serial No. 749,069

1 Claim. (Cl. 29—284)

(Granted under the act of March 3, 1883, as amended April 30, 1928; 370 O. G. 757)

This invention relates to improvements in fixtures, and more particularly to improvements in frames adapted to tilt objects positioned thereon.

Present practice in flame-cutting a beveled groove in a plate entails laying out one side of said groove that is to be bevel cut, aligning said side with the flame cutting torch, then setting the torch at the desired angle and making the first cut. After the cut is made, the plate is turned around, a second side of said groove that is to be bevel cut is laid out and aligned with the torch, the torch is set at the desired angle and the second cut made. Thus, accuracy of the bevel cut depends primarily on the accuracy of the layout and the skill of the operator, and the operation is relatively slow.

The primary object is to provide a fixture of simple and durable construction adapted to tilt an object positioned thereon to a predetermined angle.

Another object is to provide a fixture adapted to secure an object at a predetermined angle for the performance of a flame-cutting operation thereon.

A further object is to provide a fixture adapted to secure an object within a range of angular positions for the performance of a flame-cutting operation thereon.

Still another object is to provide a fixture adapted to tilt an object seated thereon from a first predetermined angular position to a second predetermined angular position.

Further objects and advantages of this invention, as well as its construction, arrangement and operation, will be apparent from the following description and claims in connection with the accompanying drawing, in which the single figure is an exploded isometric view of a fixture, showing a preferred embodiment of the invention.

A plate 11 adapted to be positioned on a suitable standard or table (not shown) is provided with end plates 13 disposed at opposite ends of said plate 11 and extending at an angle therefrom. Said end plates 13 are each provided with bores 15 medial the edge of said end plates distal the plate 11, said bores being adapted to receive the pivot pins hereinafter described, and each of said edges slopes from the point of location of each said bore to define a pyramid.

A rocker plate 17 is provided with conical pivot pins 19 secured in its nether face and adapted to be seated in the bores 15, a plurality of stop plates 21 mounted on selected edges of said rocker plate and adapted to retain an object positioned thereon, a plurality of spaced setscrews 23 engaged in threaded bores in said rocker plate and positioned to abut the sloping edges of one of the end plates 13 upon tilting of the rocker plate 17 on its pivot pins 19, and a medial cutout portion or recess 25. A rod 27 extends therefrom to form a handle adapted to tilt said rocker plate.

When an object on which a flame-cutting operation is to be performed is positioned on the rocker plate 17, abutting the stop plates 21, setscrews 23 are set to desired dependencies to proscribe the limits of tilt of the rocker plate 17 on the fulcra of the pivots 19. The flame-cutting torch is then positioned vertically and aligned with the groove to be cut. (Since the recess 25 is so proportioned that the cut is taken above it, said rocker plate 17 is not cut or otherwise damaged during the cutting operation.)

After one side is cut with the rocker plate disposed at an angle determined by one setscrew, the said rocker plate is tilted to the angle determined by the second setscrew and the other side is cut.

Various modifications and changes can be made in the subject device without departing from the scope of the invention.

The invention described herein may be manufactured and used by or for the Government of the United States of America for governmental purposes without the payment of any royalties thereon or therefor.

I claim:

A fixture comprising a first plate, end plates extending from opposite ends of said first plate at an angle thereto and provided with sloping edges each defining an apex distal said first plate, bores in said apexes, a second plate provided with a medial cutout portion, a plurality of stop plates mounted on selected edges of said second plate and pins seated in said bores to permit tilting of said second plate relative said first plate, a handle extending from an edge of said second plate, and a plurality of setscrews extending through said second plate and adapted to abut points on the sloping edges of said end plates.

VINCENT L. TILLI.

REFERENCES CITED

The following references are of record in the file of this patent:

UNITED STATES PATENTS

| Number | Name | Date |
|---|---|---|
| 273,530 | Hill | Mar. 6, 1883 |
| 982,314 | Tothill | Jan. 24, 1911 |
| 1,402,881 | Murchie | Jan. 10, 1922 |
| 1,407,084 | Pryor | Feb. 21, 1922 |
| 1,561,170 | Kline | Nov. 10, 1925 |